July 8, 1924.
R. C. BENNER
1,500,221
STORAGE CELL OR BATTERY AND ELECTRODE THEREFOR
Filed May 3, 1922
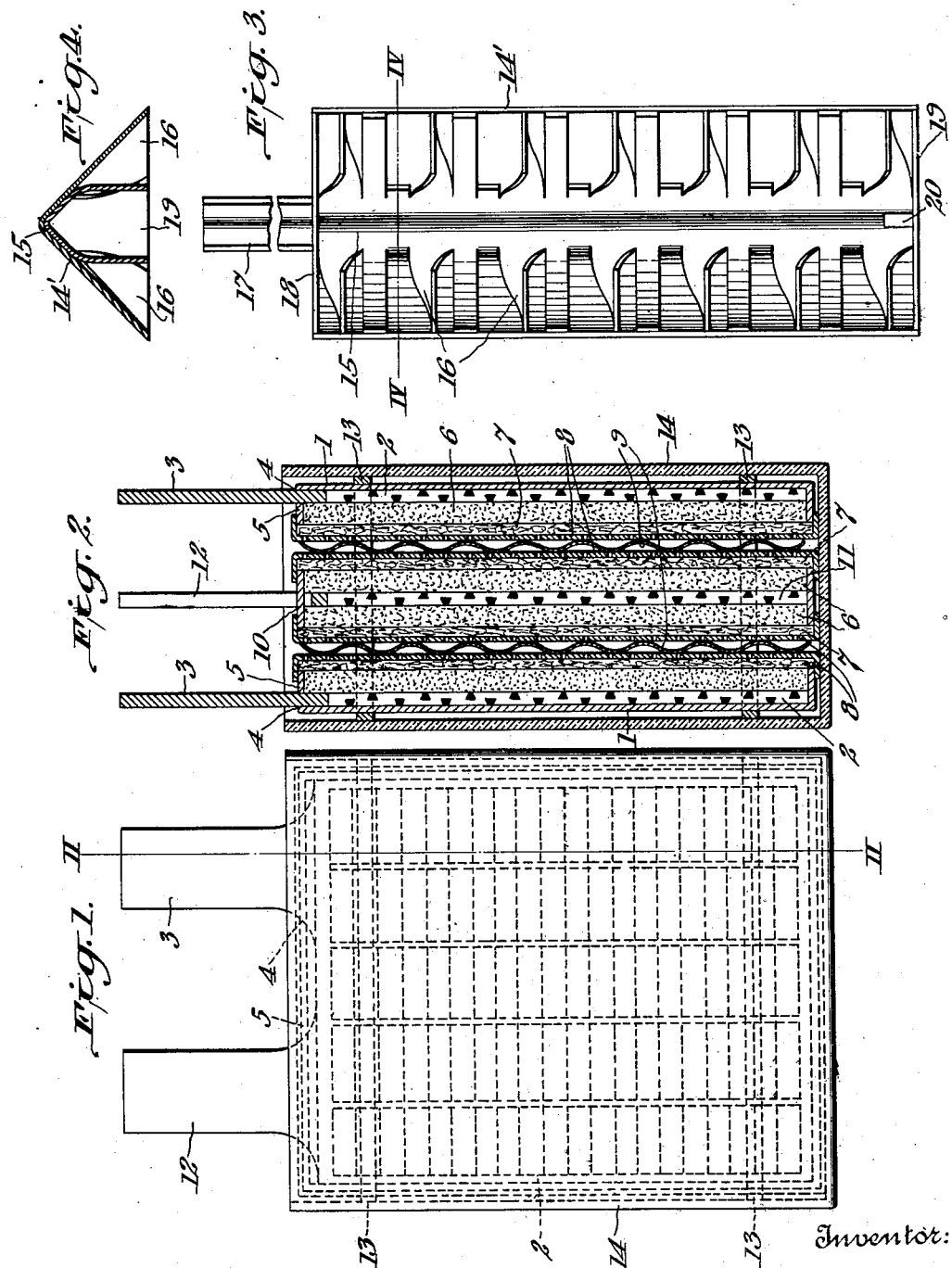
Inventor:
Raymond C. Benner,
By Byrnes, Townsend & Brickenstein,
Attorneys.

Patented July 8, 1924.

1,500,221

UNITED STATES PATENT OFFICE.

RAYMOND C. BENNER, OF BAYSIDE, NEW YORK, ASSIGNOR, BY MESNE ASSIGNMENTS, TO THE PREST-O-LITE COMPANY, INC., OF NEW YORK, N. Y., A CORPORATION OF NEW YORK.

STORAGE CELL OR BATTERY AND ELECTRODE THEREFOR.

Application filed May 3, 1922. Serial No. 558,110.

*To all whom it may concern:*

Be it known that I, RAYMOND C. BENNER, a citizen of the United States, residing at Bayside, in the county of Queens and State of New York, have invented certain new and useful Improvements in Storage Cells or Batteries and Electrodes Therefor, of which the following is a specification.

This invention relates to storage cells and batteries, particularly those of the miniature type adapted for use in flashlights or other electrical apparatus in which a small, readily portable storage cell or battery is required. The invention resides in certain described arrangements of the electrodes in light, acid resistant casings, such as may be formed from celluloid, and in the assembly of celluloid encased cells to form batteries of improved type.

It is the principal object of the present invention to provide light weight, rechargeable storage cells in which the shedding of active material is prevented, and in which the rate of deterioration on shelf is low.

The invention will be described in detail in connection with the accompanying drawing, in which—

Fig. 1 is a front elevation of a battery having the active material encased in celluloid or the like.

Fig. 2 is a vertical transverse section on line II—II, Fig. 1.

Fig. 3 is a front elevation of a modified form of container for the active material, and Fig. 4 is a horizontal transverse section on line IV—IV, Fig. 3.

Referring first to Figs. 1 and 2 of the drawings, reference numeral 1 denotes a shallow rectangular box or container formed of a suitable electrolyte-proof material. I prefer to make the container of celluloid, though a number of other substances, such as rubber, phenolic condensation products, and the like, may be used, A grid 2, of any suitable type, is placed at or near the bottom of container 1, and a lug 3 formed upon the grid extends through a slot 4 in side wall 5. Container 1 is filled with active material 6, which is suitably compacted upon grid 2 and leveled to correspond to the height of the side wall 5. A layer of electrolyte absorbent 7, such as glass wool or other inert, porous substance, is placed upon the mass of active material and a perforated separator 8 rests upon the absorbent, the margin of the separator being turned down to overlap the container 1. The separator is preferably made of celluloid.

As will be clear from Fig. 2, the assembly so far described is in duplicate. Between the two assemblies, and separated from them by corrugated rubber spacers 9, is a central rectangular frame 10, similar to containers 1, but without a bottom. A grid 11 is placed centrally in frame 10, and has a lug 12 extending through a slot in the frame. The active material is packed on both sides of grid 11, and a layer of electrolyte absorbent 7 and a separator 8, which may be of the type previously described, are placed on each side of the active material. Bands 13 of acid resistant material may be placed about the electrodes to retain them in assembled position. The three encased masses of active material are arranged as shown and placed in a suitable container 14, adapted to contain electrolyte. It will be seen that the electrolyte can come into contact with the active material only on the faces which oppose each other, and that the construction is adapted to prevent shedding of the material. The grid is situated as far as possible from the active surface, thereby reducing local action and corrosion of the grid.

The battery illustrated is preferably of the lead-sulfuric acid-lead peroxide type, the active material in containers 1 being lead peroxide and that in frame 10 being finely divided lead. However, the invention is not limited to this particular form of battery nor to the specific arrangement shown.

Instead of the absorbent 7 and perforated separator 8, I may use one or more sheets of porous, acid resistant material, to space the electrodes. Such sheets are preferably formed from a composition of cellulosic fiber and soluble silicate as described and claimed in my application Ser. No. 530,943, filed January 21, 1922.

In the form of the invention shown in Figs. 3 and 4, a trough-shaped container 14', of celluloid or the like, is provided. A conductive support 15, triangular in cross section, has outstanding arms 16, adapted to be received in the trough-shaped container and to support active material therein. A lug 17 on the grid extends outwardly from the container, passing through a cap member 18. The container has a bottom 19 and is secured to the active material support 15 by a strip 20 cemented to the container and support. Celluloid is the preferred material for the container. Either positive or negative material may be filled into containers of the kind shown in Figs. 3 and 4, and they may be arranged in any suitable manner in a jar or casing adapted to contain electrolyte.

I am aware that it has heretofore been proposed to place the electrodes of small storage cells in a celluloid casing, and I do not claim such construction broadly. The present invention presents many features of novelty and of practical advantage, as exemplified in the devices specifically described herein, but it will be understood that various modifications of structure and arrangement of parts may be made without loss of the advantages of the invention, and that such modifications are within its scope as defined in the appended claims.

I claim:

1. A storage cell comprising a container, active material and electrolyte therein, and an impervious, acid resistant means preventing exposure of an extended portion of the surface of the active material to the action of the electrolyte, whereby action upon the active material is restricted to the desired area.

2. A storage cell comprising a container, active material and electrolyte therein, and an impervious layer of celluloid covering an extended portion of the surface of the active material and preventing access of electrolyte thereto.

3. An electrode for storage batteries, comprising an impervious casing having an open portion and formed of acid resistant, non-conductive material, a conductor in said casing, active material in contact with said conductor, and a cover for the open portion of the casing and containing perforations to permit the passage of electrolyte into contact with the active material.

4. An electrode assembly for storage batteries, comprising electrodes of opposite polarity, each comprising a conductor and active material partly enclosed in an impervious, acid resistant, non-conductive casing, separators permeable by electrolyte between said electrodes and overlying the exposed surface of the active material, and means for retaining the electrodes and separators in assembled relation.

5. A storage battery comprising a container, electrolyte therein, electrodes comprising active material and a conductor in an impervious, acid resistant, non-conductive casing having an open portion, perforate means covering the open portion of the casings and permitting access of the electrolyte to the active material, an electrode of polarity opposite to said first mentioned electrodes, and means for retaining the several electrodes in spaced operative relation.

6. An electrode for storage batteries, comprising an impervious casing having an open portion and formed of acid-resistant, non-conductive material, active material in said casing, and a conductor positioned in the active material at a place remote from the open portion of the casing, whereby corrosion of the conductor is reduced.

In testimony whereof, I affix my signature.

RAYMOND C. BENNER.